United States Patent [19]
Molloy

[11] Patent Number: 4,848,815
[45] Date of Patent: Jul. 18, 1989

[54] COFFEE FILTER EXTRACTOR

[76] Inventor: Toni J. Molloy, 523 Keating, Lincoln, Nebr. 68521

[21] Appl. No.: 225,886

[22] Filed: Jul. 29, 1988

[51] Int. Cl.⁴ .......................... B25J 1/02; A47F 13/06
[52] U.S. Cl. ..................................................... 294/1.1
[58] Field of Search ............... 294/1.1, 61, 8.5, 11, 294/28, 25, 26; 221/210, 259

[56] References Cited

U.S. PATENT DOCUMENTS

| | | | |
|---|---|---|---|
| 4,073,530 | 2/1978 | Seidler | 294/1.1 |
| 4,083,075 | 4/1978 | Hester | 294/1.1 |
| 4,285,114 | 8/1981 | Underdahl | 294/1.1 |
| 4,676,396 | 6/1987 | Mamolou | 294/1.1 |

OTHER PUBLICATIONS

Miles Kimball of Oshkosh Catalog vol. 2A, page.

Primary Examiner—James B. Marbert
Attorney, Agent, or Firm—Zarley, McKee, Thomte Voorhees & Sease

[57] ABSTRACT

A coffee filter extractor includes a flat disc-shaped portion having an adhesive surface thereon for contacting a coffee filter. A handle is attached to the disc for easy operation. The adhesive surface can be periodically replaced with new adhesive. A second embodiment of the invention has an adhesive coated portion at the lower end of an elongated strip. The upper portion of the strip may be decorated with an ornamental design.

3 Claims, 2 Drawing Sheets

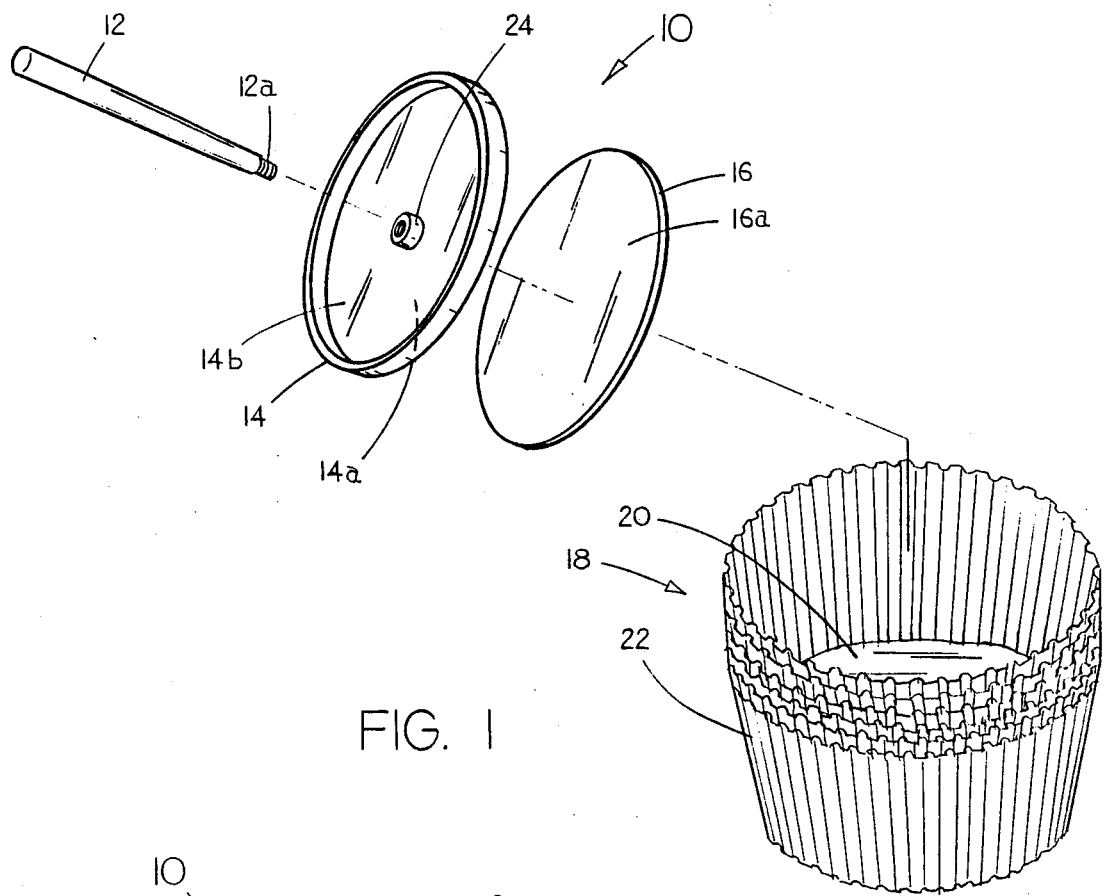
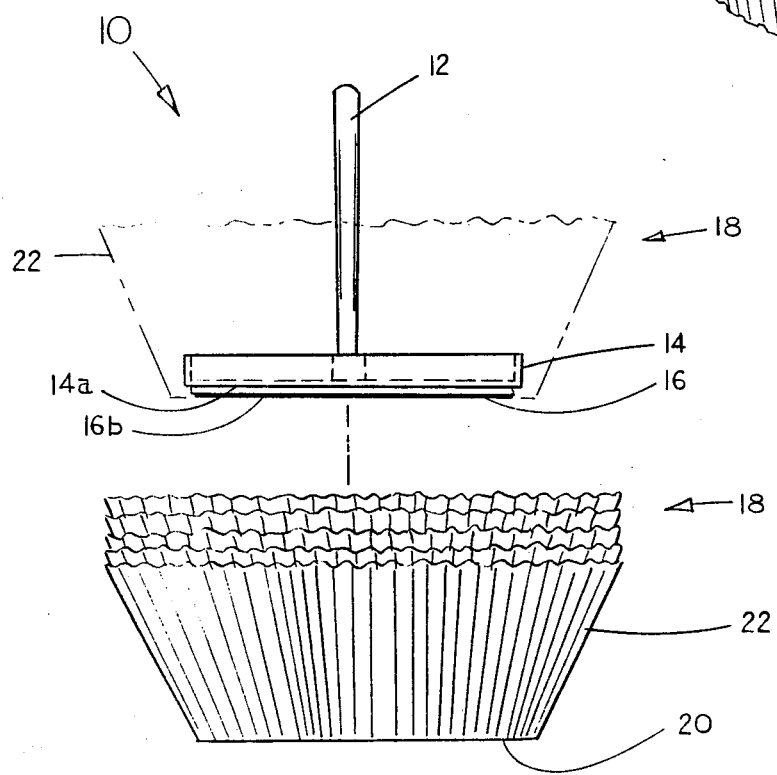
FIG. 1
FIG. 2

COFFEE FILTER EXTRACTOR

TECHNICAL FIELD OF THE INVENTION

The present invention relates generally to devices for extracting the coffee filter from a stack of coffee filters.

BACKGROUND OF THE INVENTION

Since the advent of the automatic drip coffee maker, it has become common for the average household to have a stack of coffee filters for use with the coffee maker. The more common type of filter is the "basket" type, which has a flat bottom and a corrugated, expandable side. The filters are sold in packs containing very large numbers of filters nested together into a stack.

One of the common problems with a stack of filters, is the difficulty in removing a single filter from the stack. Because of the nested relationship of the filters, it is quite difficult to remove only one filter from the stack. For this reason, it is typically necessary to remove the entire stack of filters from the cupboard and bend over a portion of the edges of the filters in order to grasp one at a time.

It is therefore a general object of the present invention to provide an improved coffee filter extractor.

Another object is to provide a coffee filter extractor which will remove a single filter from a stack of filters.

A further object of the present invention is to provide a coffee filter extractor which is simple to use.

Yet another object is to provide a coffee filter extractor which has no moving parts.

Still a further object of the present invention is to provide a coffee filter extractor which is economic to manufacture and refined in appearance.

These and other objects of the present invention will be apparent to those skilled in the art.

SUMMARY OF THE INVENTION

The coffee filter extractor of the present invention includes a flat disc-shaped portion having an adhesive surface thereon for contacting a coffee filter. A handle is attached to the disc which will allow the adhesive surface to be quickly and easily placed in contact with a coffee filter and thereby remove the filter from the stack. The adhesive surface can be periodically replaced with new adhesive.

A second embodiment of the invention has an adhesive coated portion at the lower end of an elongated strip. The adhesive may be placed against the side of a coffee filter so as to extract the filter from a stack. The upper portion of the strip may be decorated with an ornamental design.

BRIEF DESCRIPTION OF THE DRAWINGS

FIG. 1 is an exploded perspective view of the present invention.

FIG. 2 is a side view of the invention showing its use in extracting a filter.

DESCRIPTION OF THE PREFERRED EMBODIMENT

Figure 3:
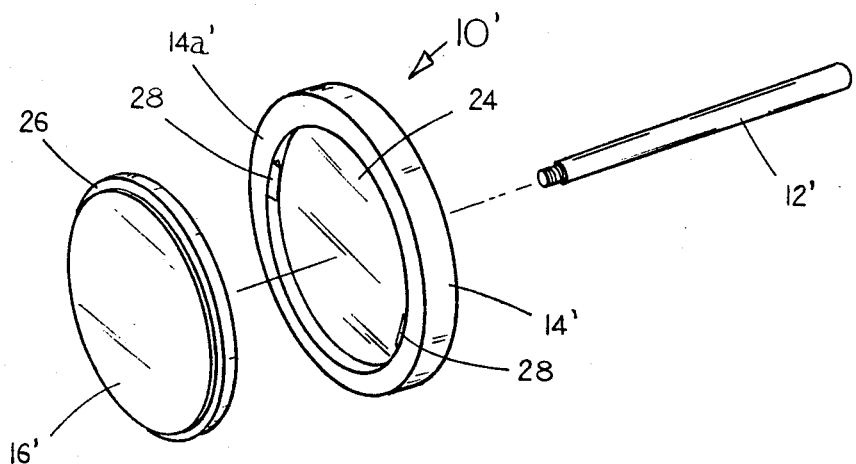
FIG. 3 is an exploded perspective view of a second embodiment of the invention.

Referring now to the drawings in which similar or corresponding parts are identified with the same reference numerals, and more particularly Figures and 2, the coffee filter extractor of this invention is designated generally at 10 and includes a handle portion 12 mounted on a resilient plate 14 with an adhesive pad 16 affixed to plate 14. A stack of coffee filters are indicated generally at 18, and include a generally flat bottom portion 20 and a corrugated side portion 22 extending upwardly from the circumference of the bottom 20.

Plate 14 of filter extractor 10, is generally disc-shaped and has a flat bottom surface 14a upon which adhesive disc 16 is removably mounted. It is preferred that adhesive disc 16 be formed from double-back tape, or the like, such that one side 16a of the disc may be mounted to bottom surface 14a of plate 14, while the other adhesive surface 16b of disc 16 is used to pick up the coffee filter 18.

The upper surface 14b of plate 14 has a sleeve 24 mounted generally in the center thereof and which is interiorly threaded Handle 12 has an exteriorly threaded end 12a which may be threaded within said sleeve 24 in a well-known fashion. In this way, handle 12 may be easily replaced as necessary.

Coffee filter extractor 10 is utilized by applying an adhesive disc 16 to the bottom surface 14a of plate 14. When it is desired to remove a coffee filter, the extractor 10 is held by handle 12 and placed in contact with a coffee filter bottom 20 in the top of the stack of filters 18. The adhesive disc 16 will pull the topmost filter, against which it is contacted, from the filter stack, as extractor 10 is raised (see FIG. 2). The retracted filter 18 may be easily removed from extractor 10 by grasping the side 22 of the filter 18 and pulling it off of adhesive disc 16.

Figure 4:
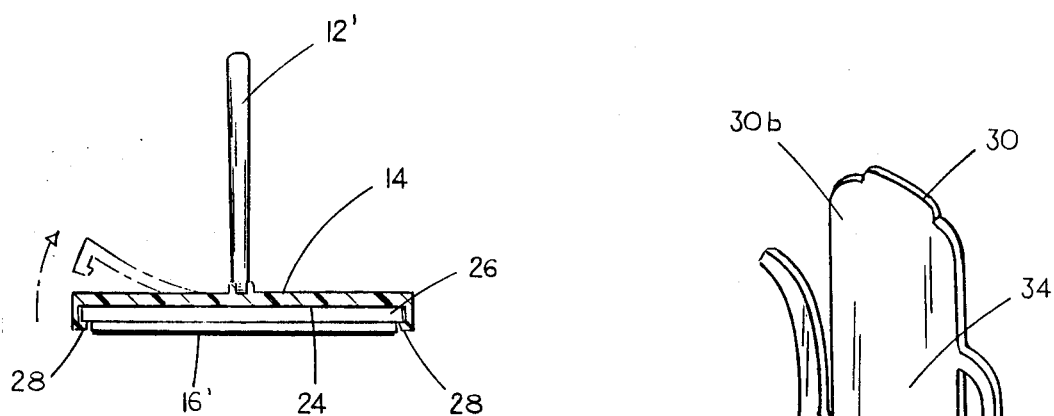
FIG. 4 is a side sectional view of the embodiment of FIG. 3.

Referring now to FIGS. 3 and 4, a second embodiment of the invention is designated generally at 10, and includes a handle 12′, a plate 14, and an adhesive disc 16′, Plate 14′ includes a recessed circular portion 24 in bottom surface 14a′. Recessed portion 24 will receive a disc-shaped support 26 upon which adhesive disc 16′ is mounted, as shown in the drawings. A pair of hook-like members 28 are mounted on diametric sides of recessed portion 24 to receive support disc 26, which may be snapped into position as shown in the drawings.

Plate 14 is comprised of a resilient material such that the edges may be bent upwardly, as shown in FIG. 4, so as to allow for the removal of support disc 26. It can be seen that this embodiment of the invention allows for easy replacement of support disc 26 and adhesive disc 16′ therewith.

Figure 5:
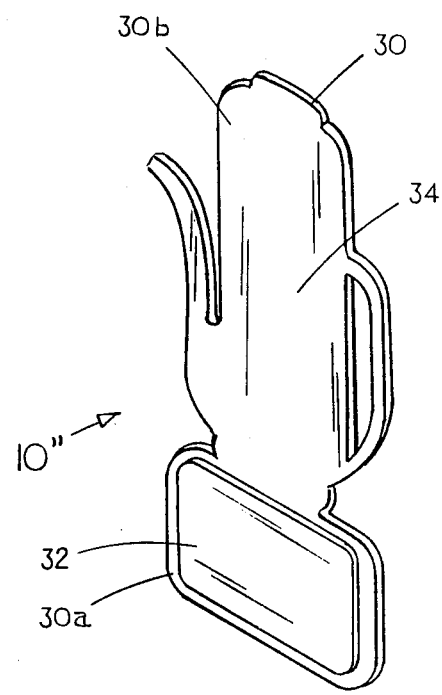
FIG. 5 is a perspective view of a third embodiment of the invention.

A third embodiment of the invention is disclosed in FIG. 5, and is designated generally at 10″. Coffee filter extractor 10″ is composed of an elongated strip 30 of generally rigid material, which has an adhesive pad 32 mounted at its lower end 30a along one face 34 thereof. The upper end 30b of extractor 10″ may be formed in the shape of a coffee pot, or the like, as shown in FIG. 5. Any desirable graphics may also be imprinted or attached to the upper end 30b of extractor 10″.

The use of coffee extractor 10″ is slightly different than that of the first two embodiments. Extractor 10″ is oriented vertically so as to attach adhesive pad 32 to the side panel 22 of the coffee filter 18. Upper end 30b of extractor 10″ will project above the side 22 and may be grasped by the user so as to lift the upper filter out of the stack. Double-backed tape may be utilized as the adhesive pad 32, in a fashion similar to the first two embodiments, and thus may be easily replaced.

Whereas the invention has been shown and described in connection with the preferred embodiments thereof, it will be understood that many modifications, substitutions and additions may be made which are within the scope of the intended claims. For example, handle 12 may be permanently affixed to plate 14, or removable in any number of conventional ways. Likewise, a plain rectangular strip may be utilized in place of the ornate coffee pot shaped strip shown in FIG. 5.

It can therefore be seen that all of the above stated objectives have been accomplished by the above described invention.

I claim:

1. A coffee filter extractor, comprising:
   a handle portion having upper and lower ends;
   an adhesive pad support means mounted at the lower end of said handle portion;
   said support means including a plate means oriented perpendicularly to said handle portion, with the handle portion mounted to an upper surface thereof;
   said plate means having a lower surface with a recess therein adapted for removably receiving an adhesive pad therein;
   means on said plate means for selectively, removably retaining an adhesive pad in said recess; and
   an adhesive pad means removably mounted in said plate recess, and having a lower surface adapted for removable adhesion to a coffee filter.

2. The coffee filter extractor of claim 1, wherein said plate means is resiliently bendable and said pad holding means includes a pair of diametrically disposed hook means releasably retaining said pad within said recess, said hook means being releasable from said pad upon the resilient bending of said plate means.

3. A coffee filter extractor, comprising:
   an elongated strip of rigid material having upper and lower ends and forward and rearward surfaces;
   an adhesive material mounted on the forward surface at the lower end of said strip, said adhesive material of a type adapted for removable adhesion to a coffee filter;
   said adhesive material extending only partially along said forward surface, such that an adhesive-free portion remains at the upper end of said strip for gripping by a user.

* * * * *